United States Patent
Oike et al.

[11] Patent Number: 5,839,408
[45] Date of Patent: Nov. 24, 1998

[54] EXHAUST CONTROL APPARATUS FOR A SPARK-IGNITION TWO-STROKE INTERNAL COMBUSTION ENGINE

[75] Inventors: Ikuo Oike; Kazunori Okada, both of Saitama, Japan

[73] Assignee: Honda Giken Kogyo Kabushiki Kaisha, Tokyo, Japan

[21] Appl. No.: 877,904

[22] Filed: Jun. 18, 1997

[30] Foreign Application Priority Data

Jun. 18, 1996 [JP] Japan ................................ 8-156721

[51] Int. Cl.⁶ .................................................. F02D 39/04
[52] U.S. Cl. ..................................... 123/323; 123/65 PE
[58] Field of Search ................................. 123/323, 65 V, 123/65 PE, 65 P

[56] References Cited

U.S. PATENT DOCUMENTS

| | | | |
|---|---|---|---|
| 4,807,571 | 2/1989 | Yamamoto et al. | 123/323 |
| 4,829,945 | 5/1989 | Yamamoto et al. | 123/65 PE |
| 4,903,647 | 2/1990 | Yamamoto et al. | 123/323 |
| 4,938,178 | 7/1990 | Schlunke et al. | 123/65 PE |
| 5,063,887 | 11/1991 | Ozawa et al. | 123/73 C |
| 5,063,888 | 11/1991 | Ozawa et al. | 123/73 C |

FOREIGN PATENT DOCUMENTS 59-218331  12/1984  Japan .

*Primary Examiner*—David A. Okonsky
*Attorney, Agent, or Firm*—Birch, Stewart, Kolasch & Birch, LLP

[57] ABSTRACT

An exhaust control apparatus for a high level engine output and engine efficiency for obtaining a stable operation from a low speed to a high operating speed in a spark-ignition two-stroke internal combustion engine with an exhaust timing that can be adjusted. A spark-ignition two-stroke internal combustion engine is equipped with an exhaust channel that opens via an exhaust port into the cylinder, and an exhaust control valve that is supported for reciprocation along the cylinder centerline direction along the exhaust port and that allows at least the portion of the exhaust port on the cylinder head side to be blocked. A valve body depression forms a hollow from the cylinder head side to the crank side in the exhaust control valve by a bottom wall, side walls, and a control wall. A housing depression is provided that allows the above-mentioned exhaust control valve to be withdrawn from the abovementioned exhaust channel. A communicating hole allows a space, which is bounded by the housing depression and the valve body depression, to communicate with the above-mentioned exhaust channel which is provided on the bottom wall of the exhaust control valve.

17 Claims, 9 Drawing Sheets

EXHAUST CONTROL APPARATUS FOR A SPARK-IGNITION TWO-STROKE INTERNAL COMBUSTION ENGINE

BACKGROUND OF THE INVENTION

1. Field of the Invention

The present invention relates to an exhaust control apparatus that allows a high level of engine output and engine efficiency to be obtained stably from low to high operating speeds in a spark-ignition two-stroke internal combustion engine whose exhaust timing can be adjusted.

2. Description of Background Art

In a spark-ignition two-stroke internal combustion engine including an exhaust port and a scavenging port that are opened and closed by the reciprocal motion of the piston and are made to open into the cylinder, an exhaust channel and a scavenging channel that respectively communicate with said exhaust port and scavenging port are formed. A fresh charge that has been pre-compressed in the crank chamber is sent to the cylinder via said scavenging channel and scavenging port. The fresh charge is compressed in said cylinder and is ignited by a spark plug. The burned gas is discharged from the exhaust port to the exhaust channel. However, there is a problem referred to as blow-by, in which part of the fresh charge that flows from the crank chamber into the cylinder via the scavenging channel and the scavenging port is discharged to the exhaust channel along with the burned gas without first residing in the cylinder. This tends to result in higher fuel consumption and in atmospheric pollution by the HC (hydrocarbons) in the unburned gas.

An approach utilized in the past to suppress this blow-by of the fresh charge was to suitably set the shape, size, and volume of the exhaust system (such as the exhaust channel and the exhaust pipe), and use the reflected wave of the exhaust gas flowing through said exhaust system.

However, the timing at which the reflected wave generated at the exhaust port and reflected at the terminus of the exhaust system returns to the exhaust port varies with the operating state of the engine, and with the speed of the engine in particular. Therefore, exhaust systems were designed in the past so that the reflected wave would reach the exhaust port while the engine was at a high operating speed, and it was difficult to suppress the blowby of the fresh charge over a wide range of operating speeds.

In an effort to solve this problem, as shown in FIG. 13, an exhaust port 03 and a scavenging port 04 were provided for a cylinder 02 in which a piston 01 moved up and down. A displacement chamber opening 06 and a displacement chamber 07 were formed above the upstream portion of an exhaust channel 05 for communicating with said exhaust port 03. An exhaust control valve 08 was rotatably disposed at said displacement chamber opening 06 and exhaust port 03 (see Japanese Patent Publication 5-41814).

With the exhaust control apparatus discussed in this Japanese Patent Publication 5-41814, in a high-speed operating state in which the exhaust control valve 08 has been lifted to advance the timing of the exhaust commencement and to increase the exhaust opening surface area, the above-mentioned displacement chamber opening 06 is blocked off by the above-mentioned exhaust control valve 08, which shortens the effective pipe length of the exhaust system and yields an exhaust system pulsation effect that is suited for high-speed operation.

In a low-speed operating state in which the exhaust control valve 08 has been lowered to retard the timing of the exhaust commencement and to decrease the exhaust opening surface area, the above-mentioned displacement chamber opening 06 is opened up, which extends the effective pipe length of the exhaust system and yields an exhaust system pulsation effect that is suited for low-speed operation.

With the spark-ignition two-stroke internal combustion engine discussed in the abovementioned publication, the exhaust commencement timing and the exhaust opening surface area are varied continuously as the above-mentioned exhaust control valve 08 is raised and lowered. However, varying the opening surface area of said displacement chamber opening 06 only allows two values to be obtained, namely, the effective length of the exhaust system when said displacement chamber opening 06 is blocked off and the effective length of the exhaust system when said displacement chamber opening 06 is opened, so a nearly constant exhaust pulsation effect cannot be achieved over a wide range of operating conditions from low to high speed.

SUMMARY AND OBJECTS OF THE INVENTION

The present invention relates to an improvement to the exhaust control apparatus for a spark-ignition two-stroke internal combustion engine that surmounts these difficulties. A spark-ignition two-stroke internal combustion engine is equipped with an exhaust channel that opens via an exhaust port into the cylinder, and an exhaust control valve that allows at least the portion of said exhaust port on the cylinder head side to be blocked. A housing depression is formed that allows the above-mentioned exhaust control valve to be withdrawn from the above-mentioned exhaust channel. A space is formed by the above-mentioned housing depression and the above-mentioned exhaust control valve that fits therein. The volume of the space is increased or decreased by the reciprocal motion of the above-mentioned exhaust control valve. A communicating hole is provided for allowing the above-mentioned space to communicate with the above-mentioned exhaust channel.

Because the present invention is structured as above, when the above mentioned exhaust control valve is moved back and forth along the cylinder centerline so that the opening surface area of the exhaust port is continuously increased and decreased, the volume of the above-mentioned space is continuously increased and decreased and the effective length of the exhaust system is varied accordingly. As a result, the effective length of the exhaust system thus obtained allows for an exhaust pulsation effect that is suited to the operating conditions over a wide range of engine speeds, from low to high. This operation greatly enhances the output and the efficiency of the engine.

According to the present invention, the volume of the abovementioned space can be increased without making the engine any larger, and this greatly expands the range over which the effective length of the exhaust system can be increased and decreased.

According to the present invention, the above-mentioned valve body depression and the exhaust channel can be easily made to communicate in the shortest distance.

According to the present invention, the exhaust opening surface area can be easily and reliably adjusted with an extremely simple construction.

According to the present invention, the volume of the space bound by the above-mentioned housing depression and the valve body depression can be increased and decreased nearly proportionally to the opening surface area of the exhaust port, and a stable and high level of the exhaust pulsation effect can be obtained without any pronounced effect on the engine speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
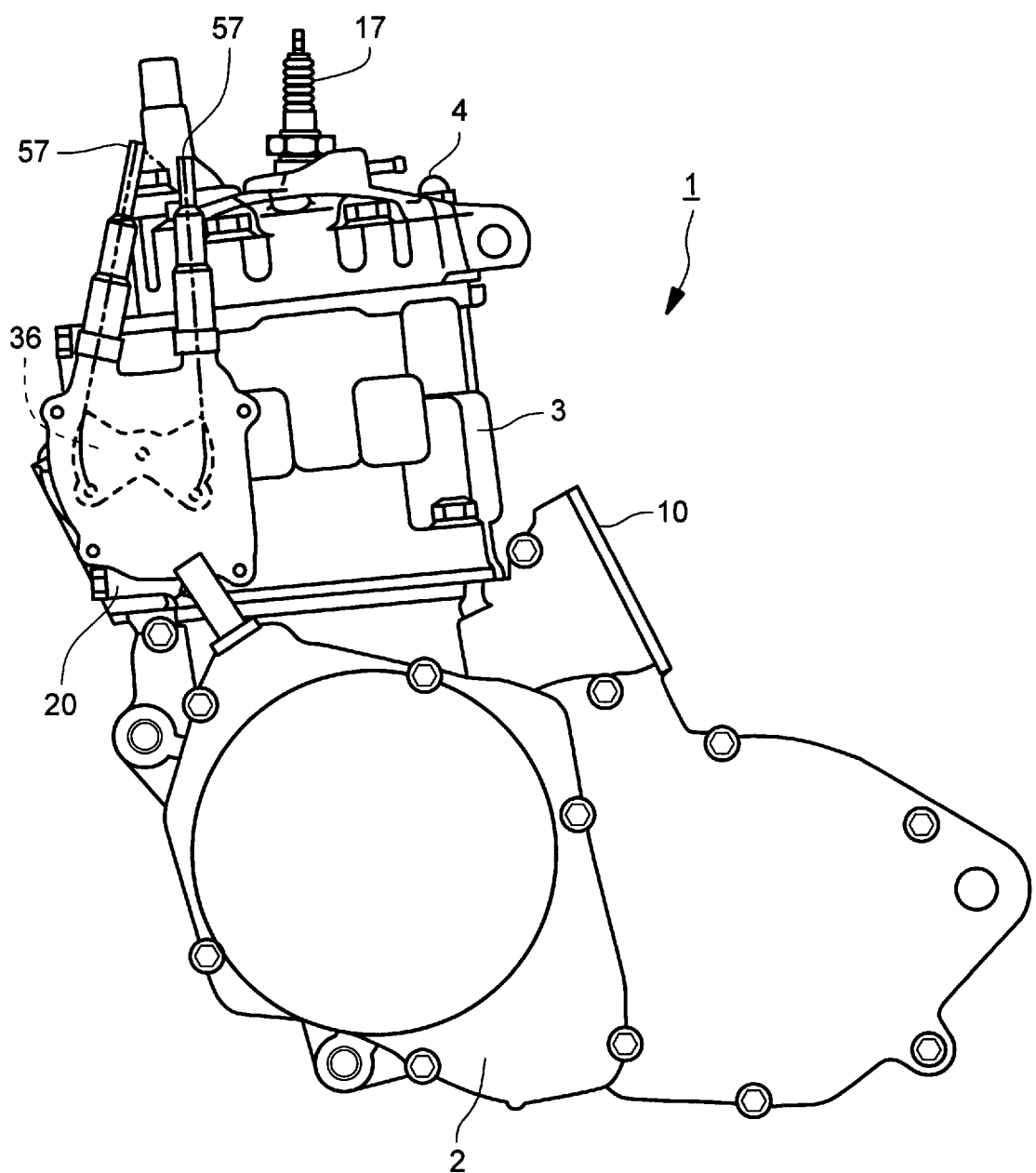
FIG. 1 is a side view of the spark-ignition two-stroke internal combustion engine equipped with an exhaust control apparatus of the present invention.
Figure 2:
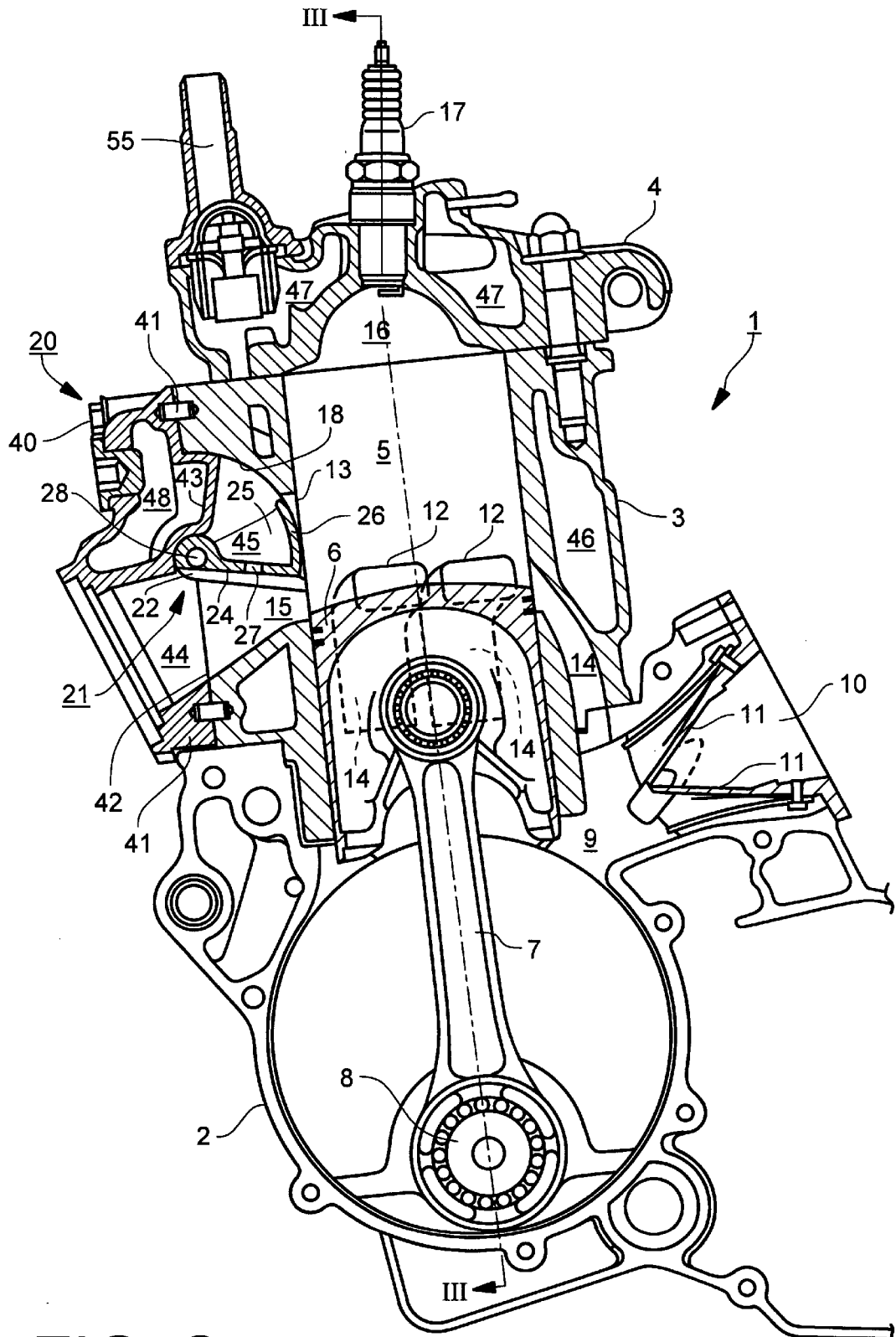
FIG. 2 is vertically cut side view of FIG. 1, and illustrates a state in which the exhaust control valve is swung downwardly.
Figure 3:
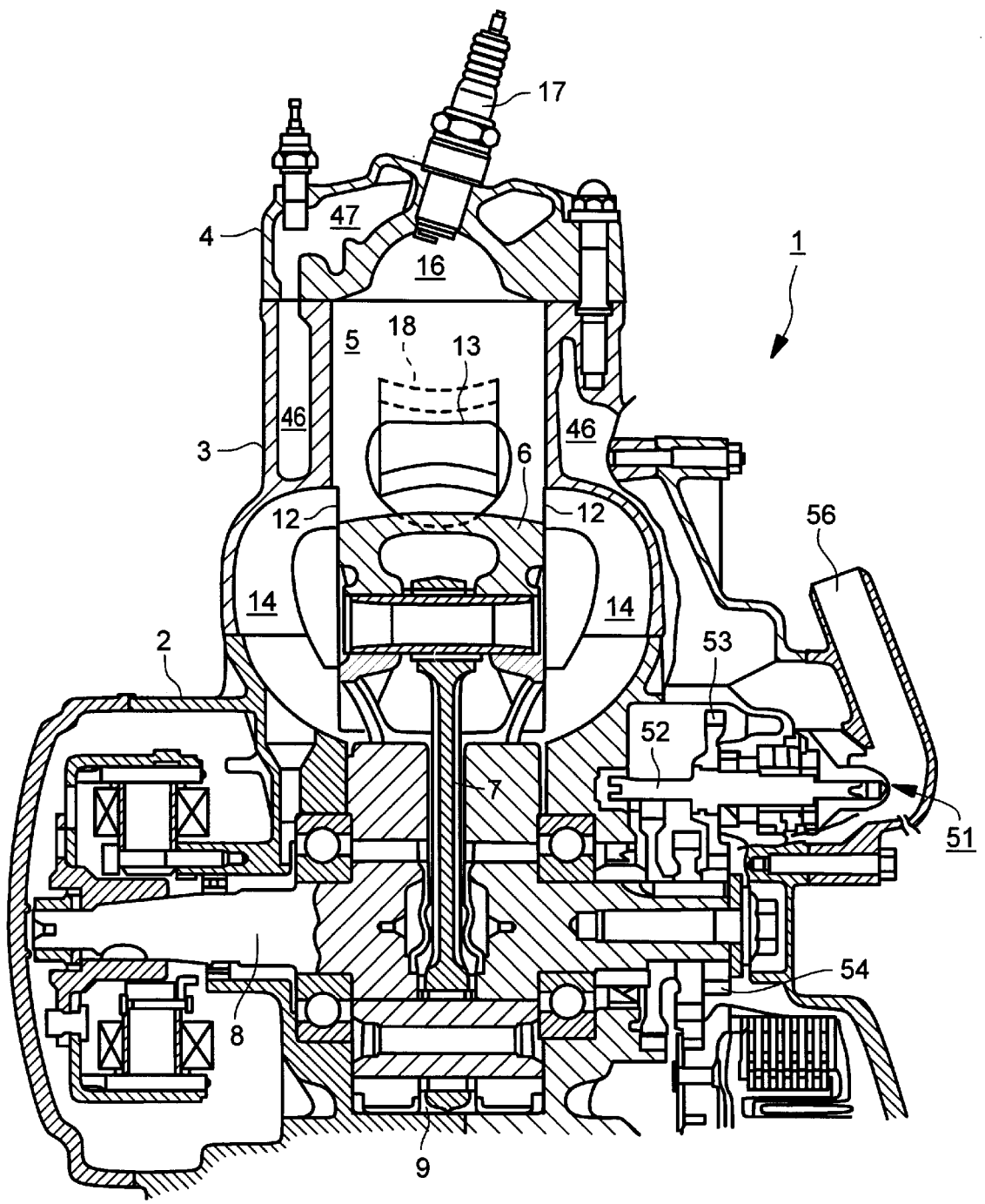
FIG. 3 is a vertically cut front view, cut along the III—III line in FIG. 2.

The embodiment of the present invention illustrated in FIGS. 1 through 10 will now be described.

The spark-ignition two-stroke internal combustion engine 1 equipped with an exhaust control valve of the present invention, is a single-cylinder internal combustion engine (a multicylinder internal combustion engine is also possible) for mounting on a motorcycle such that the cylinder block 3 is in an upward-rising attitude. With the spark-ignition two-stroke internal combustion engine 1, a cylinder block 3 and a cylinder head 4 are laid in that order above a crankcase 2, all of which are integrally joined together.

A piston 6 is fitted into a cylinder 5 formed in the cylinder block 3 such that the piston 6 can slide up and down. The piston 6 is linked to a crankshaft 8 by a connecting rod 7, and the crankshaft 8 is rotationally driven as the piston 6 rises and falls.

An intake channel 10, which communicates with the crank chamber 9 inside the crankcase 2, is formed in the crankcase 2 at a location to the rear of the cylinder block 3.

A reed valve 11 is interposed into said intake channel 10, and a carburetor (not shown) is interposed into the intake channel 10 upstream from the reed valve 11. A scavenging port 12 opens onto the inner peripheral surface of the cylinder 5, and an exhaust port 13 opens at a location relative to the intake channel 10 above said scavenging port 12. The scavenging port 12 communicates with the crank chamber 9 via a scavenging channel 14 in the cylinder block 3, and the exhaust port 13 communicates with an exhaust channel 15 in the cylinder block 3, with said exhaust channel 15 opening out ahead of the chassis.

A spark plug 17 is provided in a depression in the combustion chamber 16 above the cylinder 5. Fresh air mixed with fuel by the carburetor (not shown) is drawn on the upward stroke through the reed valve 11 into the crank chamber 9, which is under negative pressure, and is compressed on the downward stroke. As the piston 6 descends and the scavenging port 12 is opened up, the compressed fresh charge is supplied from the scavenging channel 14 into the combustion chamber 16, and part of the burned gas inside the combustion chamber 16 is discharged from the exhaust port 13 to the exhaust channel 15 by the advance of this compressed fresh charge. When the ascent of the piston 6 causes first the scavenging port 12 and then the exhaust port 13 to be blocked off, the mixture in the combustion chamber 16 is compressed by the rising piston 6 and is ignited by the spark plug 17 near top dead center.

A housing depression 18, having an approximate fan shape, (viewed from the side) is formed in the upper portion of the exhaust channel 15 near the exhaust port 13 in the cylinder block 3, and the housing depression 18 is covered by a lid member 20 equipped with an exhaust channel 44 at the downstream extension location of the exhaust channel 15 in the cylinder block 3.

An exhaust control valve 21 positioned inside the above-mentioned housing depression 18 has an approximate fan shape when viewed from the side. An axial support 22 is formed in the center of this approximate fan shape, and said axial support 22 is provided with a spline hole 23. A bottom wall 24, with a distal end edge having roughly the same radius of curvature as the cylinder 5 (in plan view), is formed at the bottom surface to said exhaust control valve 21. Side walls 25 are provided which rise perpendicularly from the side edges of said bottom wall 24. A control wall 26 is provided with a circular arc surface which rises from the distal end edge of the bottom wall 24. A communicating hole 27 is provided in the approximate center of the above-mentioned bottom wall 24.

Figure 4:
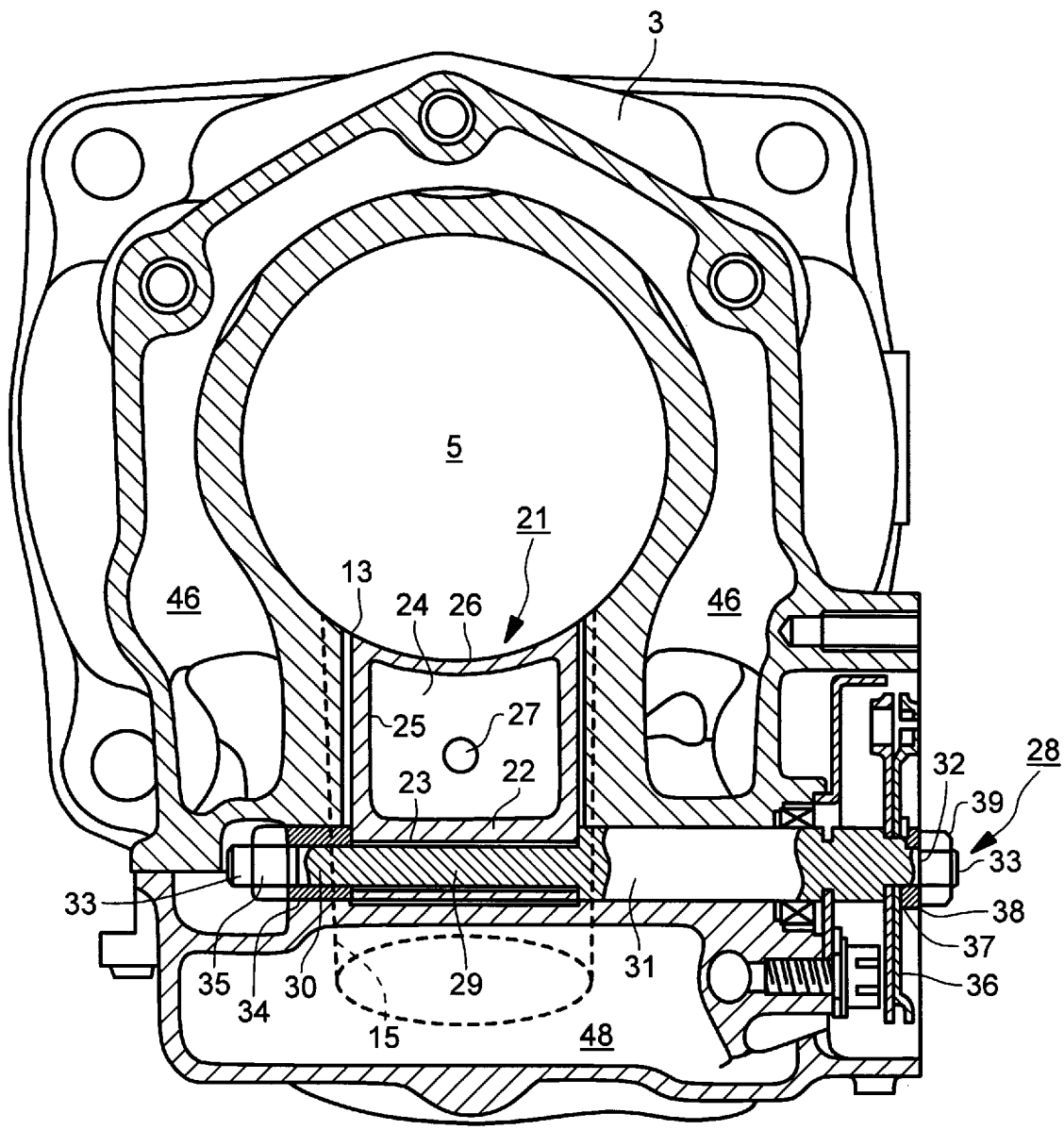
FIG. 4 is a laterally cross-sectional view of FIG. 2.
Figure 5:
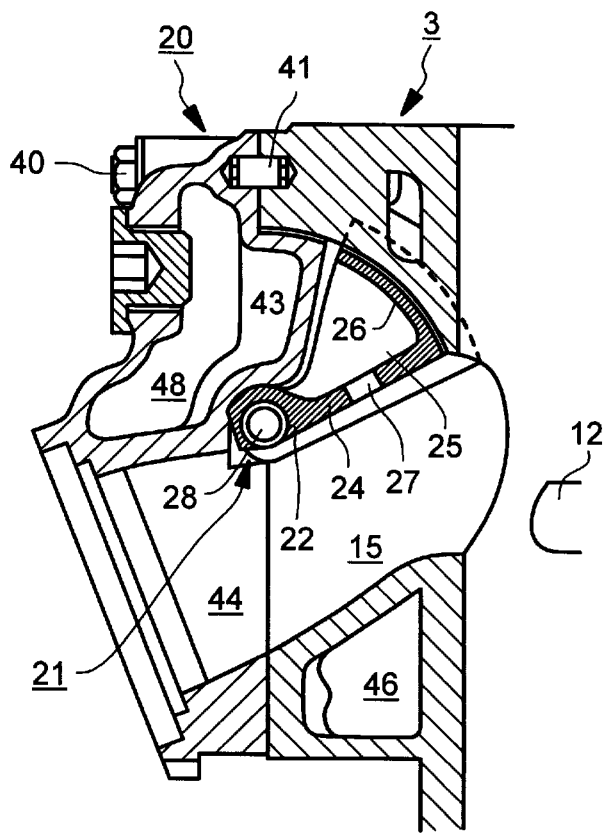
FIG. 5 is a partially vertically cross-sectional view of FIG. 4.
Figure 6:
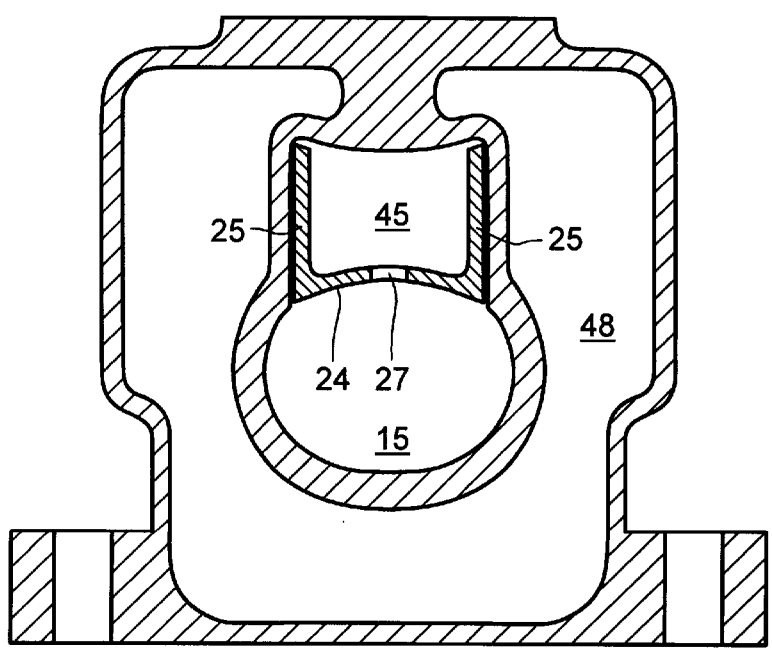
FIG. 6 is a partially vertically cross-sectional front view of FIG. 5.

As illustrated in FIG. 4, a spline 29 of a valve drive shaft 28 is fitted into the spline hole 23 of the exhaust control valve 21. A collar 34 is fitted onto the small diameter component 30 toward the distal end from said spline 29, a nut 35 is threaded onto the distal end base 31 of the small diameter component 30, and the exhaust control valve 21 is thereby integrally joined to the valve drive shaft 28.

The base 31 of the valve drive shaft 28 is formed with a diameter equal to the outside diameter of the collar 34. A pulley 36, a collar 37, and a washer 38 are fitted in that order onto the base small diameter component 32 of said base 31, and a nut 39 is threaded onto the threads 33 at the end of this base.

At the joint face at the rear end side of the lid member 20 and the front end joint face of the cylinder block 3 on the front side of the chassis, there is formed a semicylindrical depression capable of rotatably holding the base 31 of the valve drive shaft 28 and the collar 34 at a site located in the center of the fan shape of the housing depression 18. In a state in which the base 31 of the valve drive shaft 28 and the collar 34 are held in the semicylindrical depression, the lid member 20 is integrally mounted to the cylinder block 3 by means of a bolt 40 and a fixing pin 41, which allows the exhaust control valve 21 to swing up and down on the inside of the housing depression 18 around the valve drive shaft 28.

In the upper portion of the above-mentioned lid member 20 is formed a divider wall 43 that protrudes from the joint face 42 between the cylinder block 3 and the lid member 20 in an approximate fan shape that fits into the housing depression 18 of the cylinder block 3. In the lower portion of the lid member 20 is formed a downstream exhaust channel 44 that smoothly connects with the downstream end of the exhaust channel 15 of the cylinder block 3. The downstream end of said downstream exhaust channel 44 is connected to an exhaust pipe (not shown), and a space 45 is bounded by the divider wall 43, the exhaust control valve 21, and the housing depression 18 of the cylinder block 3.

Cooling water channels 46 and 46 are formed in the cylinder block 3 and the cylinder head 4, just as with an ordinary water-cooled internal combustion engine. A cooling water channel 48 is also formed in the lid member 20, and the joint face 42 between the cylinder block 3 and lid member 20 is provided with openings 49 and 50 that communicate with the cooling water channels 46 and 48, respectively.

A driven gear 53 that is integrally mounted to the rotary shaft 52 of a cooling water pump 51 is engaged with a drive gear 54 that is integrated with the crankshaft 8. When the crankshaft 8 rotates, the cooling water pump 51 is rotationally driven, the cooling water discharged from said cooling water pump 51 flows into the cooling water channel 46 of the cylinder block 3, part of it flows from the lower portion of the openings 49 and 50 to the cooling water channel 48, after which it returns from the upper portion of the openings 49 and 50 to the cooling water channel 46, then flows into the cooling water channel 47 of the cylinder head 4. This cooling water cools the cylinder block 3, the cylinder head 4, and the lid member 20. The cooling water discharged from the cooling water discharge port 55 in the cooling water channel 47 of the cylinder head 4 is sent to a radiator (not shown), and after it has cooled said radiator, it returns to the intake port 56 of the cooling water pump 51.

The above-mentioned pulley 36 is linked via a cable 57 to the drive pulley of a servo motor (not shown). The rotation of the above-mentioned servo motor is controlled by control signals from a CPU that receives input signals such as the speed, throttle opening, and intake pressure of the spark-ignition two-stroke internal combustion engine 1 and makes calculations on the basis of the required control map. The servo motor causes the exhaust control valve 21 to swing downwardly when the spark-ignition two-stroke internal combustion engine 1 is operating at a low speed, and causes the exhaust control valve 21 to swing upwardly when the spark-ignition two-stroke internal combustion engine 1 is operating at a high speed.

Figure 7:
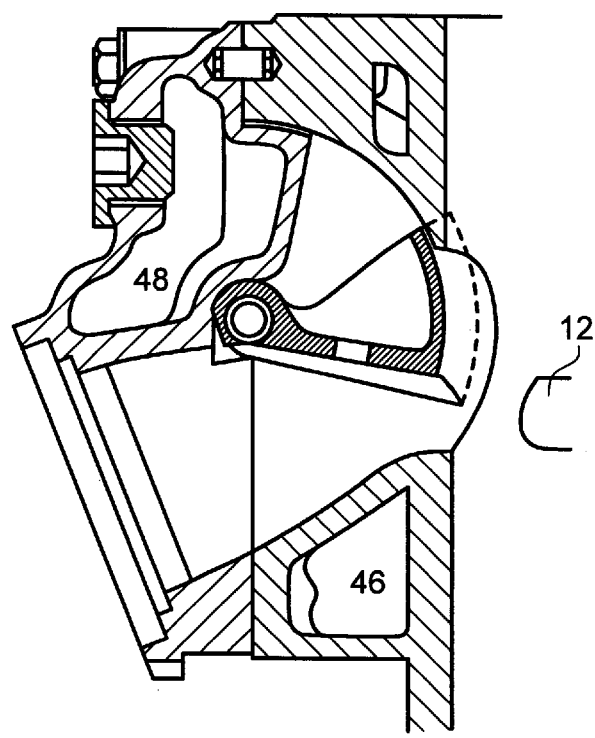
FIG. 7 is a partially vertically cross-sectional side view similar to FIG. 5, and illustrating a state in which the exhaust control valve is swung upwardly.
Figure 8:
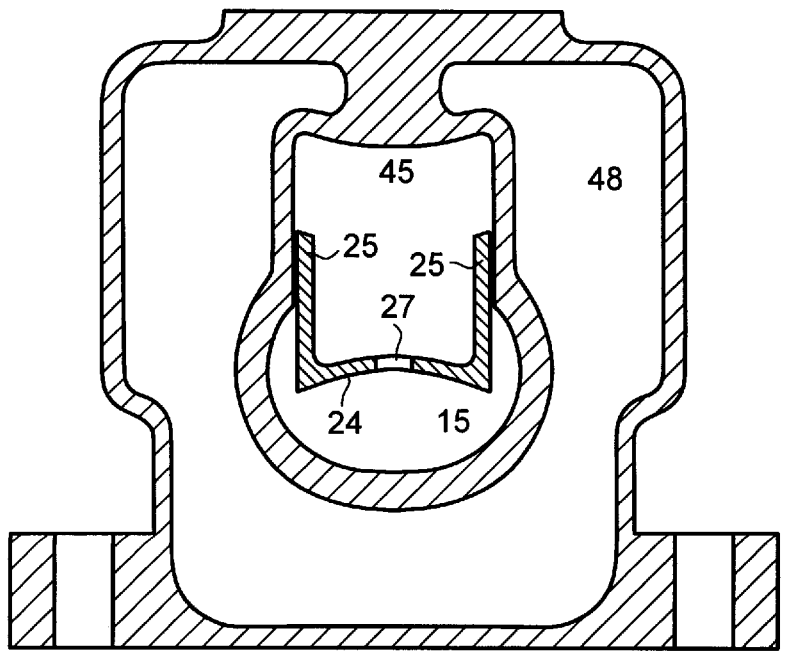
FIG. 8 is a partially vertically cross-sectional front view of FIG. 7.
Figure 9:
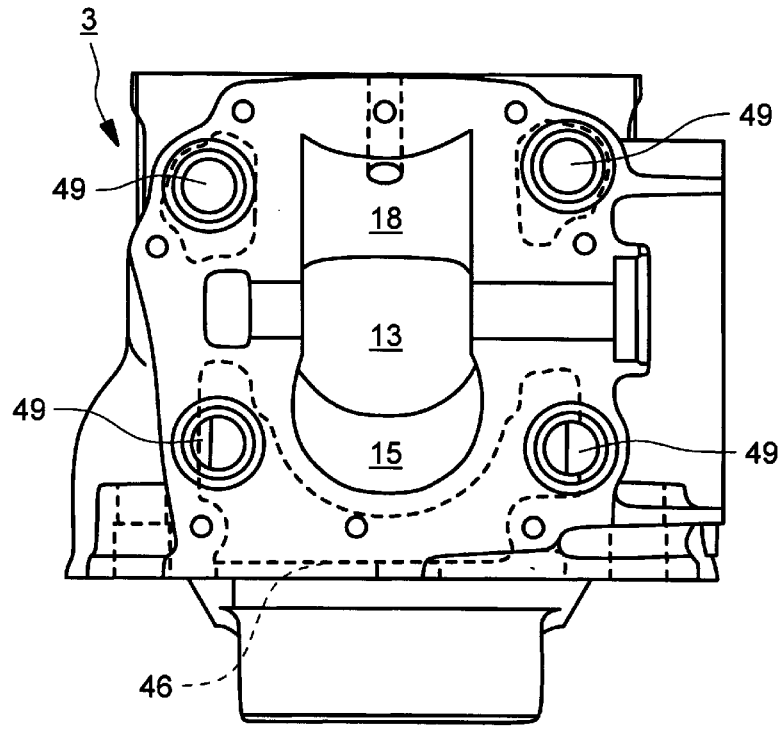
FIG. 9 is a cross-sectional view of FIG. 2.
Figure 10:
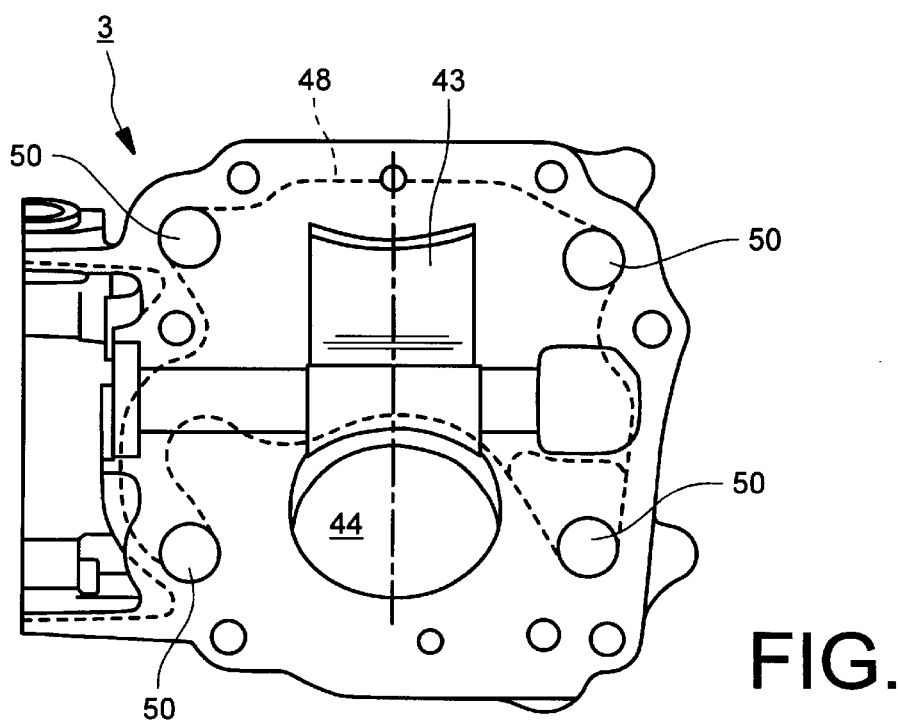
FIG. 10 is a cross-sectional view of FIG. 2.

Because the embodiment illustrated in FIGS. 1 through 10 is structured as described above, under low-speed operating conditions, such as when the engine is idling, the exhaust control valve 21 swings downwardly as shown in FIGS. 7 and 8, which accelerates the blocking commencement point of the exhaust port 13 in the downward stroke of the piston 6, retards the opening commencement point of the exhaust port 13 in the upward stroke of the piston 6, increases the compression ratio, and expands the volume of the space 45.

In a low-speed operating state such as this, the effective length of the exhaust system, comprising the exhaust channel 15, the downstream exhaust channel 44, and the exhaust pipe (not shown), is increased as a result of the greater volume of the space 45 that communicates with the exhaust system via the communicating hole 27, the positive pressure reflected wave of the exhaust gas in a low-speed operating state reaches the exhaust port 13 at a timing that matches the closing completion of the exhaust port 13. This positive pressure reflected wave prevents the blow-by of the fresh charge (unburned gas) from the exhaust port 13 to the exhaust channel 15 and the downstream exhaust channel 44 and also controls the discharge of this fresh charge, which increases the filling efficiency in the low speed operating state, increases output, and improves fuel economy.

In a state in which the exhaust control valve 21 has descended to its lower limit, a large amount of burned gas remains in the combustion chamber 16, the temperature inside the combustion chamber 16 is kept high, and the increase in compression ratio results in combustion occurring in an active heat atmosphere near top dead center, so a major decrease in output is avoided and an increase in the amount of unburned hydrocarbons in the exhaust gas is prevented.

As the crankshaft 8 is accelerated from a low-speed operating state, the exhaust control valve 21 swings upward, which retards the closing commencement point of the exhaust port 13 in the upward stroke of the piston 6, advances the opening commencement point of the exhaust port 13 in the downward stroke of the piston 6, and reduces the volume of the space 45, so a large quantity of gas can be replaced smoothly, an exhaust pressure pulsation effect can be attained, and the positive pressure reflected wave in a high-speed operating state reaches the exhaust port 13 at a timing that matches the closing completion of said exhaust port 13, and this positive pressure reflected wave suppresses the discharge of the fresh charge from the exhaust port 13, which means that good fuel economy is preserved and an increase in output is possible.

Figure 13:
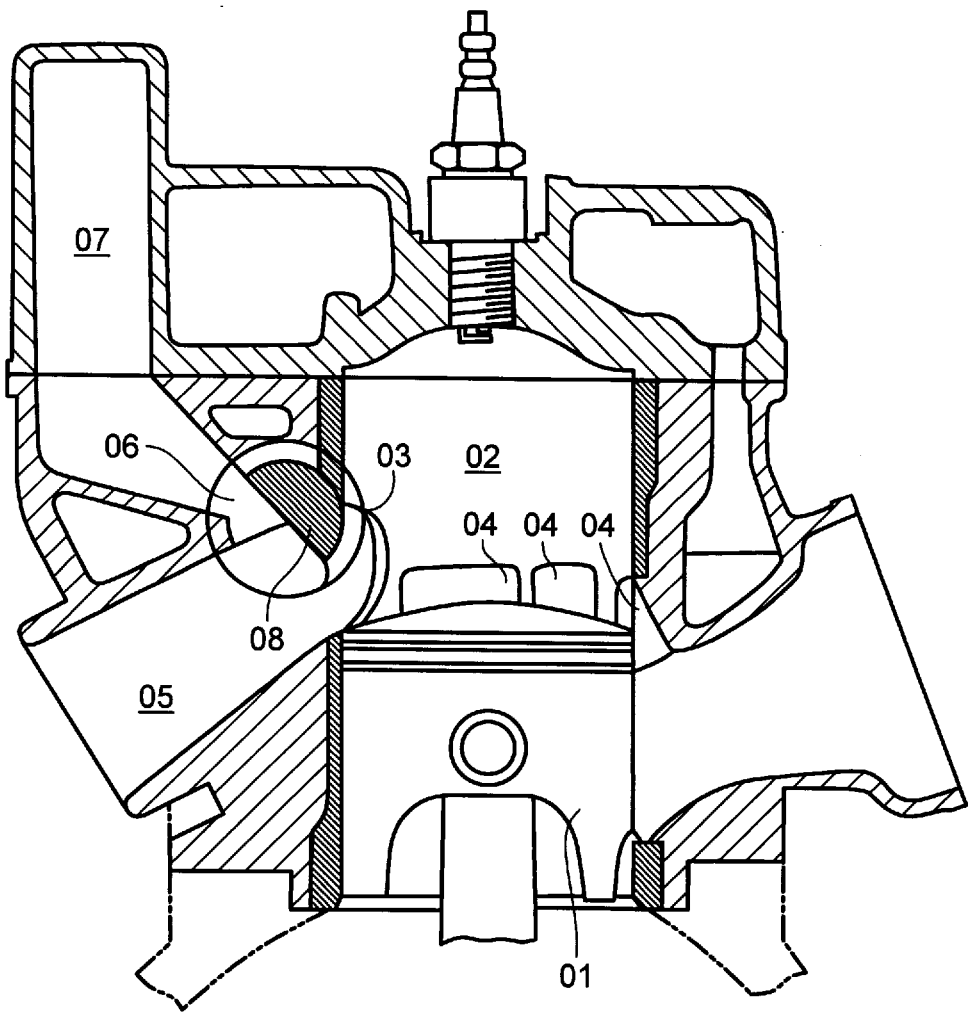
FIG. 13 is a vertically cut side view of the main components of a conventional internal combustion engine.

The volume of the above-mentioned space 45 is varied continuously according to the extent of the up-and-down swinging of the exhaust control valve 21, and the effective length of the exhaust system also varies accordingly, so an exhaust pulsation effect can be achieved over a wide range of operating speeds, from low to high, unlike the two (large and small) values that were obtained for the effective length of the exhaust system with the conventional spark-ignition two-stroke internal combustion engine shown in FIG. 13.

Furthermore, with the lid member 20 equipped with the downstream exhaust channel 44, since the outer periphery of the downstream exhaust channel 44 is surrounded by the cooling water channel 48, the outer peripheral walls of the downstream exhaust channel 44 are sufficiently cooled, and the lid member 20 is also cooled more evenly so the occurrence of a large heat distortion in the lid member 20 is avoided.

Also, since the bottom wall 24 bows out toward the downstream side on the lower edge of the control wall 26 of the exhaust control valve 21, the exhaust gas that flows near the lower edge of the control wall 26 flows smoothly, without any disturbance being caused in the exhaust channel 15 and the downstream exhaust channel 44, which allows gas replacement inside the combustion chamber 16 to be carried out more smoothly.

Figure 11:
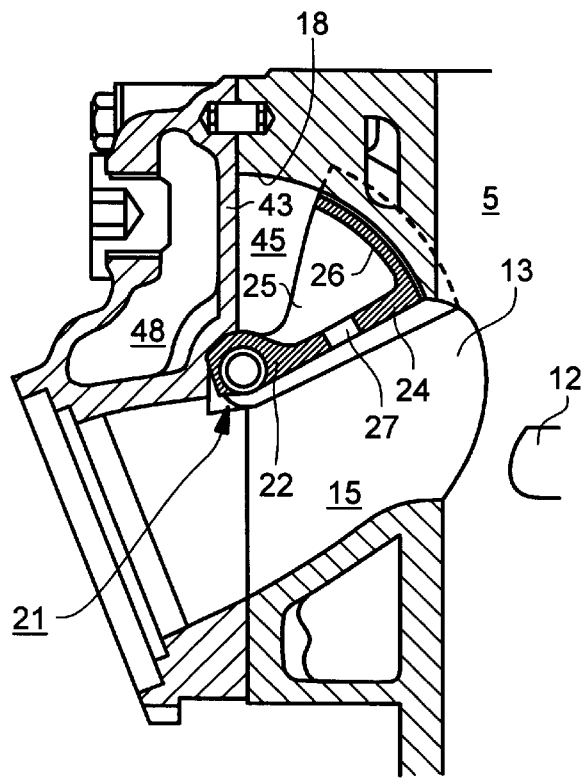
FIG. 11 is a partially vertically cross-sectional view similar to FIG. 5 and illustrating another embodiment of the present invention.
Figure 12:
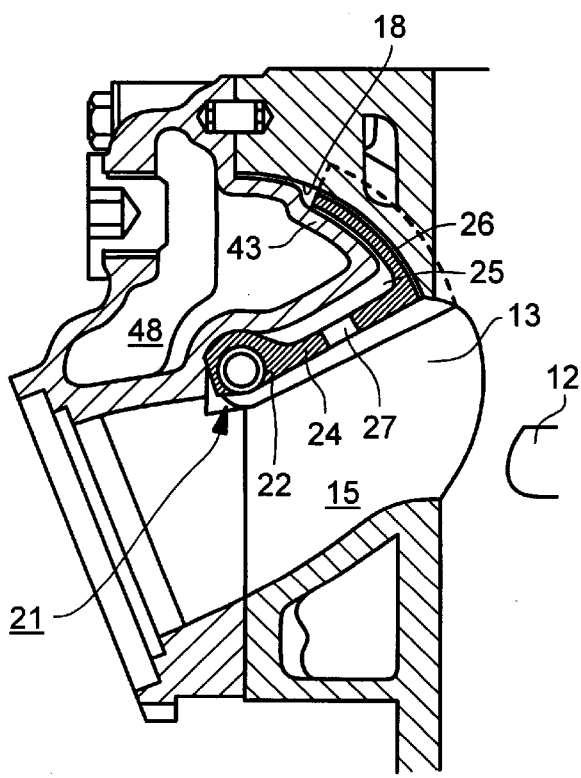
FIG. 12 is a partially vertically cross-sectional view similar to FIG. 5 and illustrating another embodiment.

In the embodiment illustrated in FIGS. 1 through 10, the divider wall 43 projects inside the housing depression 18, but the volume of the space 45 can be varied as desired by not having the divider wall 43 project inside the housing depression 18, as in FIG. 11, or by having it project more deeply inside the housing depression 18, as in FIG. 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust control apparatus for a spark-ignition two-stroke internal combustion engine comprising:
    an exhaust channel in communication with an exhaust port of a cylinder block;
    an exhaust control valve supported for reciprocation along a cylinder centerline direction along said exhaust port for blocking at least a portion of said exhaust port on a cylinder head side thereof;
    a housing depression for allowing the exhaust control valve to be withdrawn from the exhaust channel;
    a space formed adjacent to the housing depression and the exhaust control valve, an increase or decrease in the volume of said space being affected by the reciprocal motion of the exhaust control valve;
    a lid member connected to the cylinder block said lid member forming an inside wall of said housing depression; and
    a communicating hole for allowing the space to communicate with the exhaust channel.

2. The exhaust control apparatus for a spark-ignition two-stroke internal combustion engine according to claim 1, wherein the lid member includes a water passage therein, said inside wall of said lid member separating said water passage from said housing depression.

3. The exhaust control apparatus for a spark-ignition two-stroke internal combustion engine according to claim 1, wherein said lid member forms a downstream portion of said exhaust passage.

4. The exhaust control apparatus for a spark-ignition two-stroke internal combustion engine according to claim 1, wherein the exhaust control valve pivots for swinging about a downstream portion of the exhaust channel.

5. The exhaust control apparatus for a spark-ignition two-stroke internal combustion engine according to claim 4, wherein a side view shape of said exhaust control valve, valve body depression, and housing depression when viewed along the pivot axis of the exhaust control valve is a fan shape.

6. The exhaust control apparatus for a spark-ignition two-stroke internal combustion engine according to claim 1, wherein the communicating hole is provided on a bottom wall of the valve body.

7. The exhaust control apparatus for a spark-ignition two-stroke internal combustion engine according to claim 6, wherein the exhaust control valve pivots for swinging about a downstream portion of the exhaust channel.

8. The exhaust control apparatus for a spark-ignition two-stroke internal combustion engine according to claim 7, wherein a side view shape of said exhaust control valve, valve body depression, and housing depression when viewed along the pivot axis of the exhaust control valve is a fan shape.

9. The exhaust control apparatus for a spark-ignition two-stroke internal combustion engine according to claim 1, wherein the exhaust control valve includes a bottom wall, a control wall and side walls forming a valve body depression therein from a cylinder head side to a crank side thereof.

10. The exhaust control apparatus for a spark-ignition two-stroke internal combustion engine according to claim 9, wherein said control wall and said side walls extend upwardly from said bottom walls, a top surface of said side walls extending from a first end of said bottom wall to a top portion of said control wall.

11. The exhaust control apparatus for a spark-ignition two-stroke internal combustion engine according to claim 9, wherein said communicating hole is a single communicating hole formed in a center portion of the bottom wall.

12. An exhaust control apparatus for a spark-ignition two-stroke internal combustion engine comprising:
    an exhaust channel in communication with an exhaust port of a cylinder block;
    an exhaust control valve supported for reciprocation along a cylinder centerline direction along said exhaust port for blocking at least a portion of said exhaust port on a cylinder head side thereof, the exhaust control valve including a bottom wall, a control wall and side walls forming a valve body depression therein from a cylinder head side to a crank side thereof;
    a housing depression for allowing the exhaust control valve to be withdrawn from the exhaust channel; and
    wherein the exhaust control valve includes a communicating hole for allowing said housing depression and valve body depression to communicate with the exhaust channel.

13. The exhaust control apparatus for a spark-ignition two-stroke internal combustion engine according to claim 12, wherein the communicating hole is provided on the bottom wall of the valve body.

14. The exhaust control apparatus for a spark-ignition two-stroke internal combustion engine according to claim 12, wherein said control wall and said side walls extend upwardly from said bottom walls, a top surface of said side walls extending from a first end of said bottom wall to a top portion of said control wall.

15. The exhaust control apparatus for a spark-ignition two-stroke internal combustion engine according to claim 12, wherein said communicating hole is a single communicating hole formed in a center portion of the bottom wall.

16. The exhaust control apparatus for a spark-ignition two-stroke internal combustion engine according to claim 12, wherein the exhaust control valve pivots for swinging about a downstream portion of the exhaust channel.

17. The exhaust control apparatus for a spark-ignition two-stroke internal combustion engine according to claim 16, wherein a side view shape of said exhaust control valve, valve body depression, and housing depression when viewed along the pivot axis of the exhaust control valve is a fan shape.

* * * * *